US012548215B2

(12) United States Patent
Shasha et al.

(10) Patent No.: US 12,548,215 B2
(45) Date of Patent: Feb. 10, 2026

(54) AUGMENTED REALITY-ASSISTED SERVICING OF INFORMATION TECHNOLOGY ASSETS

(71) Applicant: Dell Products L.P., Round Rock, TX (US)

(72) Inventors: Osnat Shasha, Holon (IL); Alex Kulakovsky, Ra'anana (IL); Avner Friedner, Haifa (IL)

(73) Assignee: Dell Products L.P., Round Rock, TX (US)

(*) Notice: Subject to any disclaimer, the term of this patent is extended or adjusted under 35 U.S.C. 154(b) by 237 days.

(21) Appl. No.: 18/362,295

(22) Filed: Jul. 31, 2023

(65) Prior Publication Data

US 2025/0045990 A1    Feb. 6, 2025

(51) Int. Cl.
*G06T 11/60* (2006.01)
*G06T 7/246* (2017.01)
*G06V 20/20* (2022.01)
*G06V 20/40* (2022.01)
*G06F 9/54* (2006.01)

(52) U.S. Cl.
CPC ............. *G06T 11/60* (2013.01); *G06T 7/248* (2017.01); *G06V 20/20* (2022.01); *G06V 20/41* (2022.01); *G06F 9/54* (2013.01); *G06T 2200/24* (2013.01)

(58) Field of Classification Search
CPC ..... G06T 11/60; G06T 7/248; G06T 2200/24; G06T 11/00; G06V 20/20; G06V 20/41; G06F 9/54
See application file for complete search history.

(56) References Cited

U.S. PATENT DOCUMENTS

| 11,393,337 | B2* | 7/2022 | Petluru | G06F 3/04815 |
| 2020/0311647 | A1* | 10/2020 | Seshadri | G06Q 10/103 |
| 2023/0377471 | A1* | 11/2023 | Laute | G06V 20/20 |

OTHER PUBLICATIONS

Chiew, J.H., Sung, A.N. Augmented reality application for laptop assembly with assembly complexity study. Int J Adv Manuf Technol 120, 1149-1167 (2022). (Year: 2022).*

(Continued)

*Primary Examiner* — Said Broome
(74) *Attorney, Agent, or Firm* — Ryan, Mason & Lewis, LLP (57) ABSTRACT

An apparatus comprises a processing device configured to capture, via at least one camera of augmented reality hardware, a live video feed of an information technology asset. The processing device is also configured to track, in the live video feed, at least one object of interest comprising a hardware component of the information technology asset that is to be serviced. The processing device is further configured to monitor system state information characterizing operation of the information technology asset. The processing device is further configured to generate one or more additional video layers based on the tracked object of interest and the obtained system state information. The processing device is further configured to generate a layered video feed comprising the additional video layers overlayed on the live video feed of the information technology asset, and to provide, to at least one display of the augmented reality hardware, the layered video feed.

20 Claims, 6 Drawing Sheets

(56) References Cited

OTHER PUBLICATIONS

Westerfield, Giles, Mitrovic, Antonija, Billinghurst, Mark Intelligent Augmented Reality Training for Motherboard Assembly, International Journal of Artificial Intelligence in Education, vol. 25, 2015, p. 157-172 (Year: 2015).*
Riccardo Palmarini et al., A systematic review of augmented reality applications in maintenance, Robotics and Computer-Integrated Manufacturing, vol. 49, pp. 215-228 (Year: 2018).*
Dorloh, H.; Li, K.-W.; Khaday, S. Presenting Job Instructions Using an Augmented Reality Device, a Printed Manual and a Video Display for Assembly and Disassembly Tasks: What Are the Differences?. Appl. Sci. 2023, 13, 2186. (Year: 2023).*
S. C.-Y. Yuen et al., "Augmented Reality: An Overview and Five Directions for AR in Education," Journal of Educational Technology Development and Exchange, vol. 4, No. 1, Oct. 2011, pp. 119-140.
X. Feng et al., "Computer Vision Algorithms and Hardware Implementations: A Survey," Integration, vol. 69 Nov. 2019, pp. 309-320.
G. Pintzos et al., "A Novel Approach for the Combined Use of AR Goggles and Mobile Devices as Communication Tools on the Shopfloor," Procedia CIRP, vol. 25, Mar. 2014, pp. 132-137.
R. Masoni et al., "Supporting Remote Maintenance in Industry 4.0 through Augmented Reality," Procedia Manufacturing, vol. 11, Jun. 2017, pp. 1296-1302.

\* cited by examiner

AUGMENTED REALITY-ASSISTED SERVICING OF INFORMATION TECHNOLOGY ASSETS

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for augmented reality-assisted servicing of information technology assets.

In one embodiment, an apparatus comprises at least one processing device comprising a processor coupled to a memory and a tag interface. The at least one processing device is configured to capture, via at least one camera of augmented reality hardware, a live video feed of an information technology asset. The at least one processing device is also configured to track, in the live video feed, one or more objects of interest, at least one of the one or more objects of interest comprising a hardware component of the information technology asset that is to be serviced. The at least one processing device is further configured to monitor system state information characterizing operation of the information technology asset. The at least one processing device is further configured to generate one or more additional video layers based at least in part on the tracked one or more objects of interest and the monitored system state information, the one or more additional video layers comprising information facilitating servicing of the hardware component of the information technology asset. The at least one processing device is further configured to generate a layered video feed comprising the one or more additional video layers overlayed on the live video feed of the information technology asset, and to provide, to at least one display of the augmented reality hardware, the layered video feed.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
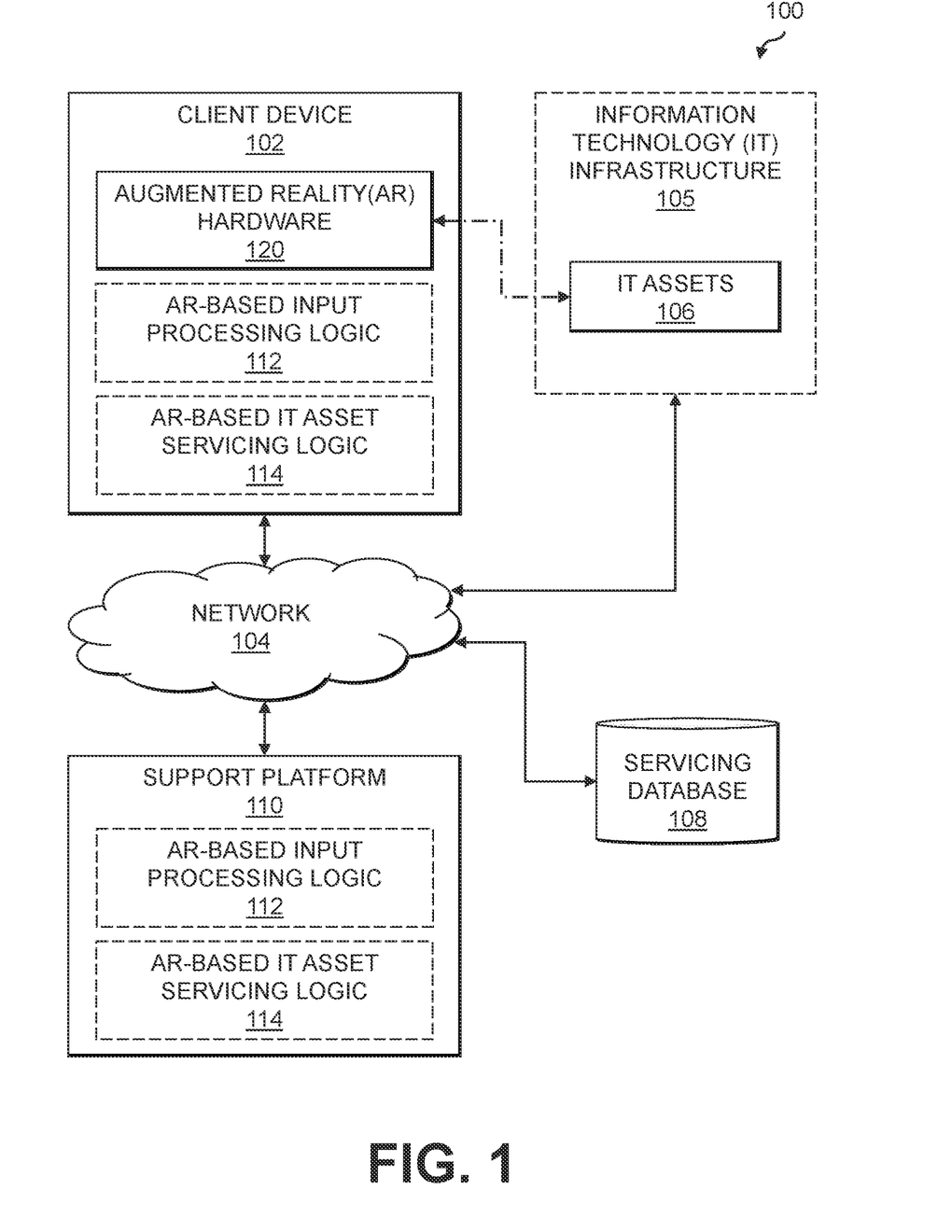
FIG. 1 is a block diagram of an information processing system configured for augmented reality-assisted servicing of information technology assets in an illustrative embodiment.

FIG. 1 shows an information processing system 100 configured in accordance with an illustrative embodiment. The information processing system 100 is assumed to be built on at least one processing platform and provides functionality for augmented reality (AR)-assisted servicing of information technology (IT) assets. The information processing system 100 includes a client device 102 which is coupled to a network 104. Also coupled to the network 104 is a servicing database 108 and a support platform 110. The client device 102 is configured to perform servicing of one or more IT assets 106 of an IT infrastructure 105. The IT infrastructure 105 may also be coupled to the network 104. The IT assets 106 are assumed to comprise physical computing resources in the IT infrastructure 105. The physical computing resource may include physical hardware such as servers, storage systems, networking equipment, Internet of Things (IoT) devices, other types of processing and computing devices including desktops, laptops, tablets, smartphones, etc. The physical computing resource may run one or more virtual computing resources, such as virtual machines (VMs), containers, etc.

In some embodiments, the support platform 110 is used for an enterprise system. For example, an enterprise may subscribe to or otherwise utilize the support platform 110 for managing the IT assets 106 of the IT infrastructure 105 operated by that enterprise. Users of the enterprise (e.g., support technicians, field engineers or other employees, customers or users which may be associated with client device 102) may utilize the support platform 110 to perform servicing of the IT assets 106. In some embodiments, it is assumed that one or more of the IT assets 106 to be serviced are "offline" or otherwise requires physical intervention for servicing (e.g., replacing one or more faulty hardware components of the IT assets 106). Such servicing is facilitated by a user of the client device 102 leveraging AR hardware 120 as described in further detail below. The client device 102, as part of servicing the IT assets 106, may communicate information obtained via the AR hardware 120 to the support platform 110, and may receive from the support platform 110 instructions for performing the servicing of the IT assets 106. As used herein, the term "enterprise system" is intended to be construed broadly to include any group of systems or other computing devices. For example, the IT infrastructure 105 may provide a portion of one or more enterprise systems. A given enterprise system may also or alternatively include one or more client devices including the client device 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client device 102 may comprise, for example, a physical computing device such as an IoT device, a mobile telephone, a laptop computer, a tablet computer, or another type of device utilized by one or more members of an enterprise, in any combination. Such devices are examples of what are more generally referred to herein as "processing devices." Some of these processing devices are also generally referred to herein as "computers." The client device 102 may also comprise virtualized computing resources, such as VMs, containers, etc.

The client device 102 in some embodiments comprises a computer associated with a particular company, organization or other enterprise. Thus, the client device 102 may be considered an example of an asset of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The servicing database 108 is configured to store and record various information that is utilized by the support platform 110 and the client device 102 for performing servicing of the IT assets 106 of the IT infrastructure 105. Such information may include, for example, identifying information for the IT assets (e.g., user interface (UI) links, quick response (QR) codes, etc.) to enable the client device 102 and/or the support platform 110 to confirm that a given one of the IT assets 106 recognized using the AR hardware 120 is the correct IT asset which needs to be serviced. The information may also include, for example, information for diagnosing and/or remediating one or more issues encountered on the IT assets 106 of the IT infrastructure 105. In some embodiments, one or more storage systems utilized to implement the servicing database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

In some embodiments, the client device 102 is assumed to be associated with a system administrator, IT manager or other authorized personnel responsible for managing the IT assets 106 of the IT infrastructure 105. For example, the client device 102 may be operated by a user to perform servicing of the IT assets 106, where such servicing is assisted or facilitated by leveraging AR hardware 120 of the client device 102. The AR hardware 120, for example, may include a camera which is used to capture information relating to a given one of the IT assets 106 to be serviced and a display which is configured to output or overlay information (e.g., instructions) for performing servicing of the given one of the IT assets 106.

In some embodiments, the IT assets 106 of the IT infrastructure 105 are owned or operated by the same enterprise that operates the support platform 110 (e.g., where an enterprise such as a business provides support for the assets it operates). In other embodiments, the IT assets 106 of the IT infrastructure 105 may be owned or operated by one or more enterprises different than the enterprise which operates the support platform 110 (e.g., a first enterprise provides support for assets that are owned by multiple different customers, business, etc.). Various other examples are possible.

In some embodiments, the client device 102 and the IT assets 106 of the IT infrastructure 105 implement host agents that are configured for exchanging information with one another and possibly the support platform 110. Such information may be related to a status or state of the IT assets 106, identifying information for the IT assets 106, servicing actions which have or are to be performed on the IT assets 106, etc. It should be noted that a "host agent" as this term is generally used herein may comprise an automated entity, such as a software entity running on a processing device. Accordingly, a host agent need not be a human entity.

The client device 102, the IT assets 106 and the support platform 110 in the FIG. 1 embodiment are each assumed to be implemented using at least one processing device. Each such processing device generally comprises at least one processor and an associated memory, and implements one or more functional modules or logic for controlling certain features of the client device 102, the IT assets 106 and the support platform 110. In the FIG. 1 embodiment, the client device 102 and/or the support platform 110 implement AR-based input processing logic 112 and AR-based IT asset servicing logic 114. It should be noted that the AR-based input processing logic 112 and the AR-based IT asset servicing logic 114 are shown in dashed outline in the FIG. 1 embodiment, as each logic may be implemented in only one of the client device 102 and the support platform 110, or may be implemented at least in part in both of the client device 102 and the support platform 110. The AR-based input processing logic 112 is configured to obtain, from the AR hardware 120 of the client device 102, information associated with one or more of the IT assets 106 which are to be serviced. Such information may include images of the IT assets 106, which are captured utilizing a camera of the AR hardware 120. This information is processed to ensure that the correct ones of the IT assets 106 (e.g., those which are to be serviced) are identified. This information may also be analyzed to identify a current state of one or more of the IT assets 106, to ensure that servicing actions on the IT assets 106 are being performed correctly, etc. The AR-based IT asset servicing logic 114 is configured to control the AR hardware 120 to display information to assist a user of the client device 102 for performing servicing of the IT assets 106 of the IT infrastructure 105. This may include, for example, outputting commands or instructions on a display of the AR hardware 120 to assist the user in performing servicing actions (e.g., to correctly locate and identify hardware components to be replaced, to provide instructions for safe handling, removal and installation of hardware components, etc.).

At least portions of the AR-based input processing logic 112 and the AR-based IT asset servicing logic 114 may be implemented at least in part in the form of software that is stored in memory and executed by a processor.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client device 102, the IT infrastructure 105, the servicing database 108 and the support platform 110 or components thereof (e.g., the AR-based input processing logic 112 and the AR-based IT asset servicing logic 114) may be implemented on respective distinct processing platforms, although numerous other arrangements are possible. For example, in some embodiments at least portions of the support platform 110 and one or more of the client device 102, the IT infrastructure 105 and/or the servicing database 108 are implemented on the same processing platform. The client device 102 can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client device 102, the IT infrastructure 105, the IT assets 106, the servicing database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 5 and 6.

It is to be appreciated that these and other features of illustrative embodiments are presented by way of example only, and should not be construed as limiting in any way.

It is to be understood that the particular set of elements shown in FIG. 1 for AR-assisted servicing of the IT assets 106 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
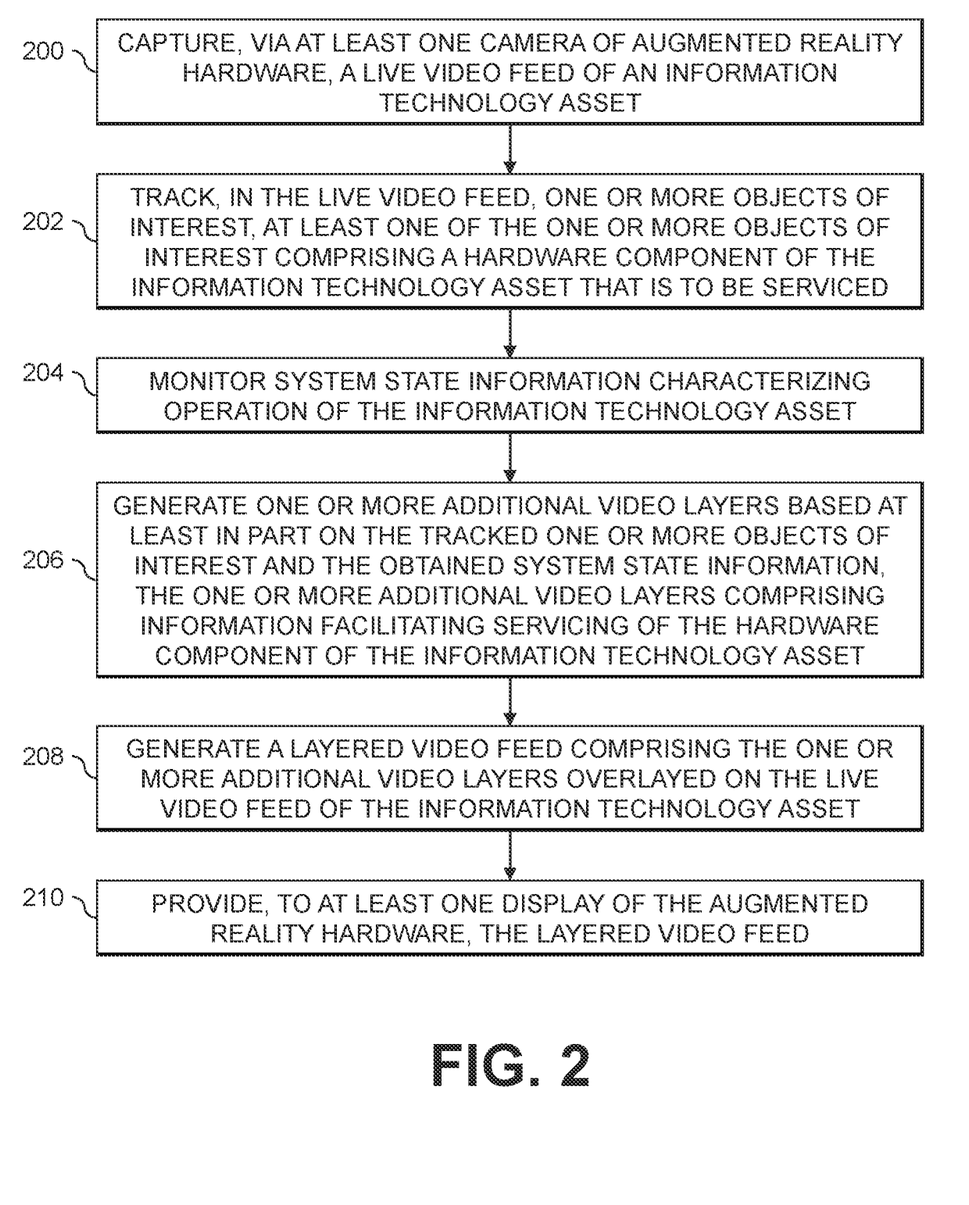
FIG. 2 is a flow diagram of an exemplary process for augmented reality-assisted servicing of information technology assets in an illustrative embodiment.

An exemplary process for AR-assisted servicing of IT assets will now be described in more detail with reference to the flow diagram of FIG. 2. It is to be understood that this particular process is only an example, and that additional or alternative processes for AR-assisted servicing of IT assets may be used in other embodiments.

In this embodiment, the process includes steps 200 through 210. These steps are assumed to be performed by the client device 102 and/or the support platform 110 utilizing the AR-based input processing logic 112 and the AR-based IT asset servicing logic 114. The process begins with step 200, capturing, via at least one camera of AR hardware (e.g., AR hardware 120), a live video feed of an IT asset (e.g., one of the IT assets 106). In step 202, one or more objects of interest are tracked in the live video feed. At least one of the one or more objects of interest comprises a hardware component of the IT asset that is to be serviced. System state information characterizing operation of the IT asset is monitored in step 204. One or more additional video layers are generated in step 206 based at least in part on the tracked one or more objects of interest and the monitored system state information. The one or more additional video layers comprise information facilitating servicing of the hardware component of the IT asset. A layered video feed comprising the one or more additional video layers overlayed on the live video feed of the IT asset is generated in step 208. In step 210, the layered video feed is provided to at least one display of the AR hardware.

The AR hardware may comprise AR googles. The AR hardware may also or alternatively comprise at least one of a smartphone and a tablet computing device. The layered video feed provided to the at least one display of the AR hardware may replace the live video feed in a camera application of the smartphone or the tablet computing device.

Monitoring the system state information characterizing the operation of the IT asset in step 204 may comprise utilizing a representational state transfer (REST) application programming interface (API) to pull the system state information of the IT asset. In some embodiments, step 204 is performed responsive to authenticating the IT asset. Authenticating the IT asset may comprise scanning a user interface link of the IT asset utilizing the at least one camera of the AR hardware. The user interface link may comprise a quick response (QR) code.

At least one of the one or more additional video layers may comprise an overlay image highlighting the hardware component to be serviced and/or an overlay image that at least one of: highlights one or more hardware slots of the IT asset in which the hardware component is to be installed; and highlights one or more cables of the IT asset which are to be at least one of connected to the hardware component to be serviced and disconnected from the hardware component to be serviced. At least one of the one or more additional video layers may comprise text instructions for how to perform servicing of the hardware component. At least one of the one or more additional video layers may comprise an animation illustrating at least a portion of a process for at least one of removal of the hardware component from the IT asset and installation of the hardware component in the IT asset.

Generating the layered video feed in step 208 may comprise dynamically updating at least one of the one or more additional video layers in response to changes in the monitored system state information of the IT asset. Generating the layered video feed in step 208 may also or alternatively comprise dynamically updating at least one of the one or more additional video layers in response to identifying, in the live video feed of the IT asset, deviation of a designated process for servicing the hardware component of the IT asset (e.g., detecting that a technician performing the servicing of the hardware component of the IT asset has made a mistake such as failing to follow one or more safety procedures, incorrectly servicing the hardware component of the IT asset, determining that servicing the hardware component of the IT asset has caused one or more issues affecting operation of the IT asset, etc.).

Service provider and IT technician human errors present a major technical problem in data centers or other types of IT infrastructure. For example, human errors during management and/or servicing of IT assets deployed in a data center or other type of IT infrastructure can lead to significant disruption, downtime, security breaches, etc. Human errors may account for 70% or more of data center problems, leading to system downtime and costly security breaches. For storage systems, such errors may lead to data unavailability (DU) or even data loss (DL). This results in negative impacts to customer or other end-user workloads and satisfaction with IT products and their associated vendors. This increases the chance that customers or end-users will switch to using the IT products of competitor vendors, bad publicity, etc. This can also lead to repeated technician or field engineer visits to fix issues, which results in high costs.

Technician or other human errors while managing or servicing IT assets may be due to various reasons, including but not limited to: not understanding a procedure for servicing of an IT asset; not following the procedure for servicing the IT asset correctly; a lack of practice with the specific type or model of IT asset; a lack of understanding of the equipment or product in which IT assets are installed or otherwise operate; a multiplicity of very complex IT assets and wiring schemes; not embedding "lessons learned" from field cases; not practicing procedures for servicing the IT asset, especially before visiting customer sites where instances of the IT asset are deployed; etc. Many of these issues can be resolved or prevented by "online" instructions which are provided to technicians (e.g., in real-time) as the technicians do maintenance, repairs or other servicing of IT assets on site. One approach is to add or utilize more knowledgeable support team members, which will watch the technician's behavior and issue warnings or other guidance as necessary. Such an approach, however, has several technical problems and disadvantages, including increasing the cost of serviceability (e.g., as more service personnel are needed), requiring expert members who must constantly be aware of all potential human errors and provide alerts, when necessary, in real-time, etc.

Illustrative embodiments provide technical solutions which utilize augmented reality (AR) technology for assisting technicians or other users who are performing servicing of IT assets. In some embodiments, a field technician uses an AR device (e.g., AR goggles, a smartphone utilizing AR technology or software which leverages one or more of the smartphone's cameras, etc.). The AR device uses image processing to examine the system hardware status of an IT asset, and to communicate and coordinate with a support platform or more generally AR-based IT asset servicing logic to provide the technicians with instructions and/or tips (e.g., which are output on the AR device) on how to proceed with servicing of an IT asset. Such instructions or tips may include, for example: when to start a repair or maintenance action (or when to stop or prevent an action) to prevent DU/DL or other undesired results; actions that should be taken in advance of any repair or maintenance actions; monitoring system light-emitting diodes (LEDs) or other status indicators during repair or maintenance actions and sending out alarms or warnings when necessary; proposing an ordering of repair or maintenance actions (e.g., which hardware part or cable should be repaired first, etc.); etc. The technical solutions described herein can advantageously reduce the risk of inducing incorrect actions in the field, and provide an additional level of confidence in executed actions. The technical solutions can in turn improve support service quality, product or other IT asset high availability statistics, and increase customer satisfaction with IT assets. The technical solutions are also well-suited for technicians working at "dark" sites (e.g., where the IT assets being service or offline or otherwise not reachable via one or more networks), where technicians are more likely to make mistakes due to a lack of connectivity to a vendor's backend support platform.

Figure 3:
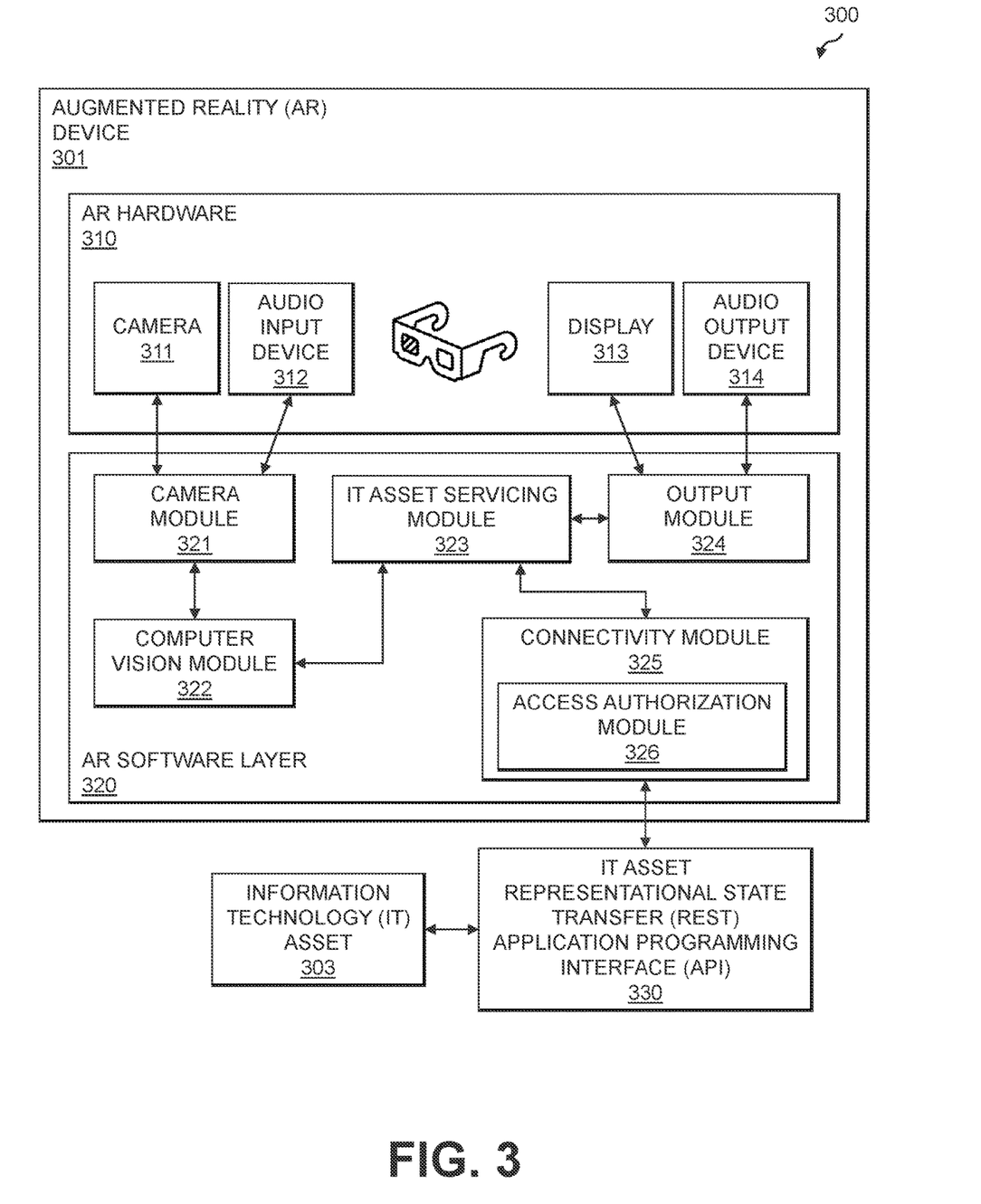
FIG. 3 shows an augmented reality device configured for servicing of an information technology asset in an illustrative embodiment.

FIG. 3 shows a system 300, including an AR device 301 which is in communication with an IT asset 303 via an IT asset representational state transfer (REST) application programming interface (API). The AR device 301 includes AR hardware 310 along with an AR software layer 320. The AR hardware 310 includes, for example, one or more cameras 311, one or more audio input devices 312, one or more displays 313, and one or more audio output devices 314. The AR software layer 320 includes a camera module 321, a computer vision module 322, an IT asset servicing module 323, an output module 324, and a connectivity module 325 implementing access authorization module 326. The camera module 321, also referred to as an input module, uses the cameras 311 (and possibly other input devices which are part of the AR hardware 310, such as the audio input devices 312 including one or more microphones) to capture a live view of the surroundings of the AR device 301. Here, the surroundings are assumed to include at least a partial view of the IT asset 303 that is to be serviced. The computer vision module 322 is configured to analyze live footage (e.g., as processed by the camera module 321) to detect specific objects of interest in the footage in order to track the areas in which the objects of interest are positioned in real time. This will be used to identify specific hardware components of the IT asset 303 to be serviced, such as one or more specific ports, LEDs, power supply units (PSUs), storage drives, cables, etc.

The IT asset servicing module 323 includes logic for analyzing the system state of the IT asset 303, which may be obtained via the connectivity module 325 using the access authorization module 326 and the IT asset REST API 330. The IT asset servicing module 323 is configured to understand the system type of the IT asset 303, hardware components of the IT asset 303 (e.g., which are being tracked as objects of interest via the computer vision module 322), events occurring on the IT asset 303 during servicing thereof, etc. The IT asset servicing module 323 further manages the logic of the servicing procedures to be carried out for the IT asset 303. It is advantageous to build the IT asset servicing module 323 and its logic as part of the AR software layer 320 of the AR device 301, since it eliminates the need for a northbound interface to a knowledge base (e.g., the servicing database 108 in the system 100) and central logic of a supplier or vendor of the IT asset 303 (e.g., the support platform 110 in the system 100). It should be noted, however, that the logic of the IT asset servicing module 323 may be provisioned and updated over time via an external entity (e.g., the support platform 110 in the system 100).

The connectivity module 325 connects to a system user interface (UI) of the IT asset 303, using the IT asset REST API 330, to pull up-to-date system information, events, hardware states, etc. therefrom. The connectivity module 325 uses the access authorization module 326 for security measures to gain access to the system UI (e.g., a web UI) of the IT asset 303). In some embodiments, the access authorization module 326 uses the IT asset REST API 330 to trigger generation of a quick response (QR) code on a UI screen of the IT asset 303. Once the QR code is scanned using the camera 311 of the AR hardware 310 of the AR device 301, the access authorization module 326 establishes a handshake with the IT asset 303 and gains access to the IT asset REST API 330 in order for the connectivity module 325 to pull the up-to-date system information, events, hardware states, etc. from the IT asset 303 for a limited amount of time.

The output module 324 uses live camera footage from the camera module 321, along with analyzed data from the computer vision module 322, the IT asset servicing module 323 and the connectivity module 325. Such information is combined and provided as output to the AR hardware 310. In some embodiments, this includes outputting an overlay image over the live camera footage from the cameras 311 on one or more of the displays 313, where the overlay image includes marked hardware components of the IT asset 303. This allows for marking the specific hardware components in a viewfinder (e.g., by outlining, highlighting, etc.). The output module 324 can also output on one or more of the displays 313 a top layer of text over the live camera feed. The output module 324 may also include text-to-speech functionality in order to output the text audially via one or more of the audio output devices 314. To summarize, the output module 324 is used to replace the original live camera feed from the one or more cameras 311 with an "edited" layered feed which includes the original video and one or more additional layers (e.g., the overlay image, the top text layer, etc.) on top of the original video.

Figure 4:
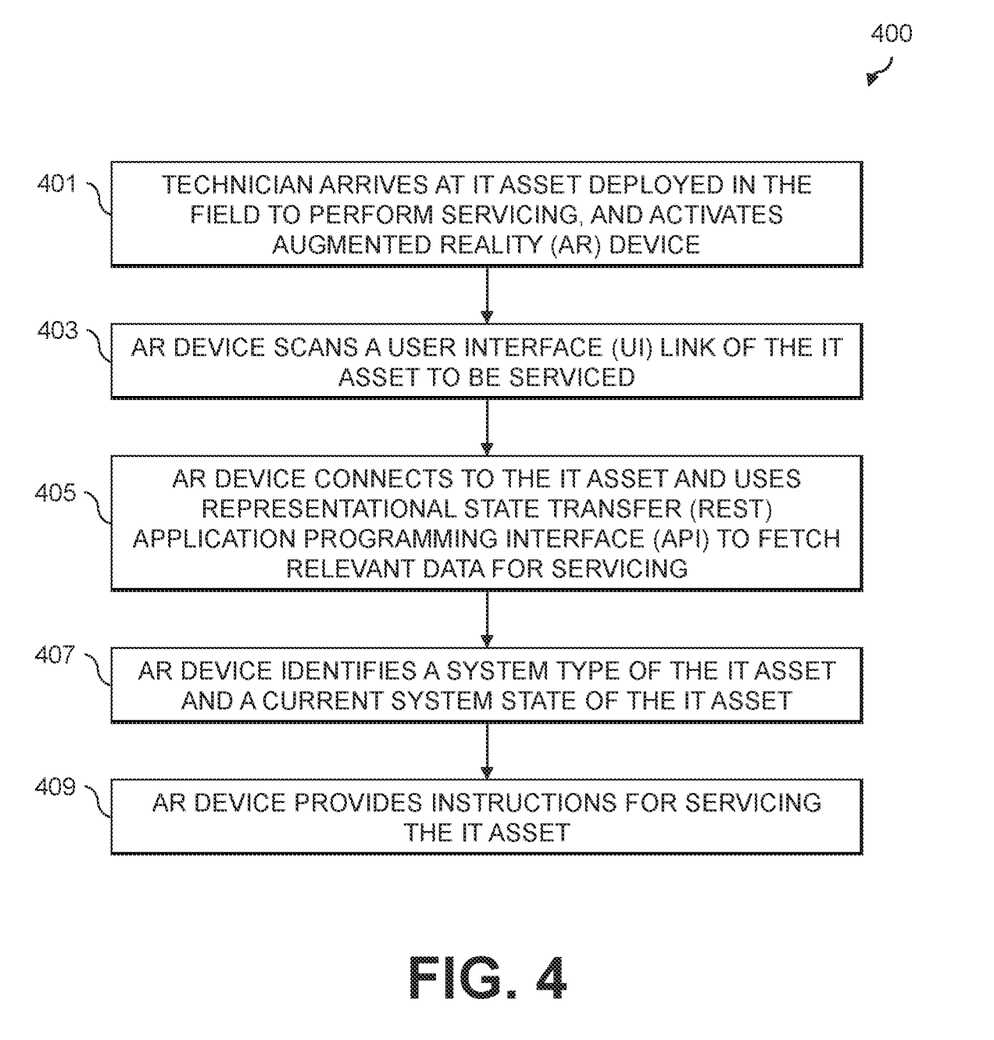
FIG. 4 shows a process flow for augmented reality-based servicing of an information technology asset in an illustrative embodiment.

FIG. 4 shows an example process flow 400 for utilizing the AR device 301 to service the IT asset 303. In step 401, a technician arrives at the IT asset 303 deployed in the field to perform servicing thereof, and activates the AR device 301. In this example, it will be assumed that the servicing includes replacing a bad PSU of the IT asset 303. It should be appreciated, however, that this is just one example and that servicing of the IT asset 303 may include various other actions including removing and/or installing various hardware components, updating a configuration of the IT asset 303 (e.g., to account for any newly removed or installed hardware components, to adjust or set the wiring of cables between different hardware components, etc.). In step 403, the AR device 301 provides a UI link of the IT asset 303 to be serviced (e.g., using the access authorization module 326 as described above). The AR device 301 in step 405 will then connect to the IT asset 303 using the IT asset REST API 330 to fetch relevant data for servicing. In step 407, the IT asset servicing module 323 identifies the system type of the IT asset 303, along with its current system state, and understands that PSU replacement is required. The IT asset servicing module 323 will verify (e.g., with the computer vision module 322) that the IT asset 303 matches the UI information from step 403 (e.g., by analyzing the picture of the IT asset 303 captured with the one or more cameras 311, scanning a QR code, etc.). The AR device 301 in step 409 then provides instructions for servicing the IT asset 303. This may include adding one or more additional layers (e.g., an overlay image with highlighted components to be serviced, a top text layer including instructions for how to service the highlighted components, etc.) to the live camera feed obtained via the one or more cameras 311.

The instructions for servicing the IT asset 303 may include, for example, warnings when some actions should be taken in advance. Continuing with the example of replacing the bad PSU of the IT asset 303, this may include safety-related actions or avoiding known issues related to PSU replacement by running some preliminary actions. The IT asset servicing module 323 will get the location of the PSU of the IT asset 303 that is to be replaced from the computer vision module 322 (e.g., as the PSU may be one of the objects of interest tracked in real-time in the live feed from the one or more cameras 311). The IT asset servicing module 323 will then instruct the output module 324 to highlight the PSU location in the final feed (e.g., as part of the overlay image added to the live camera feed). The IT asset servicing module 323 will further check if there are any special warnings to display in text for the technician. The technician operating the AR device 301 will see the PSU that is to be replaced highlighted on the one or more displays 313, along with the corresponding instructions for how to safely replace the PSU. The technician can then proceed with replacing the PSU by following the instructions. The IT asset servicing module 323 may analyze the live feed (e.g., from the camera module 321 and computer vision module 322) along with system state changes (e.g., from the connectivity module 325) to instruct the technician further if needed. For example, the IT asset servicing module 323 may track system state indicators (e.g., LED status indicators captured in the live feed from cameras 311 and processed via the camera module 321 and the computer vision module 322, system state information reported or obtained by the connectivity module 325 utilizing the IT asset REST API 330, etc.), and update the instructions which are provided to the technician accordingly.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for AR-assisted servicing of IT assets will now be described in greater detail with reference to FIGS. 5 and 6. Although described in the context of system 100, these platforms may also be used to implement at least portions of other information processing systems in other embodiments.

Figure 5:
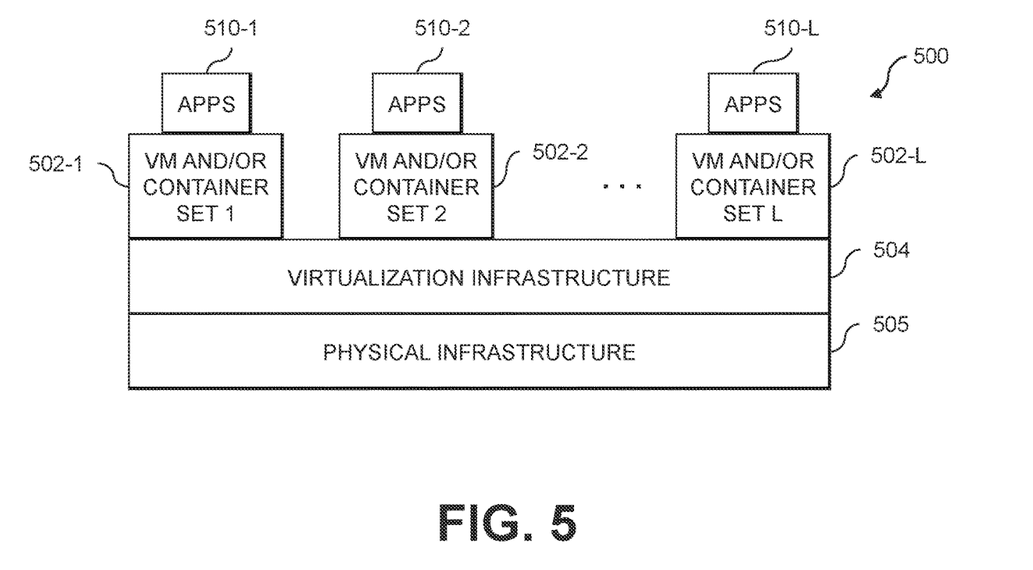
FIGS. 5 and 6 show examples of processing platforms that may be utilized to implement at least a portion of an information processing system in illustrative embodiments.
Figure 6:
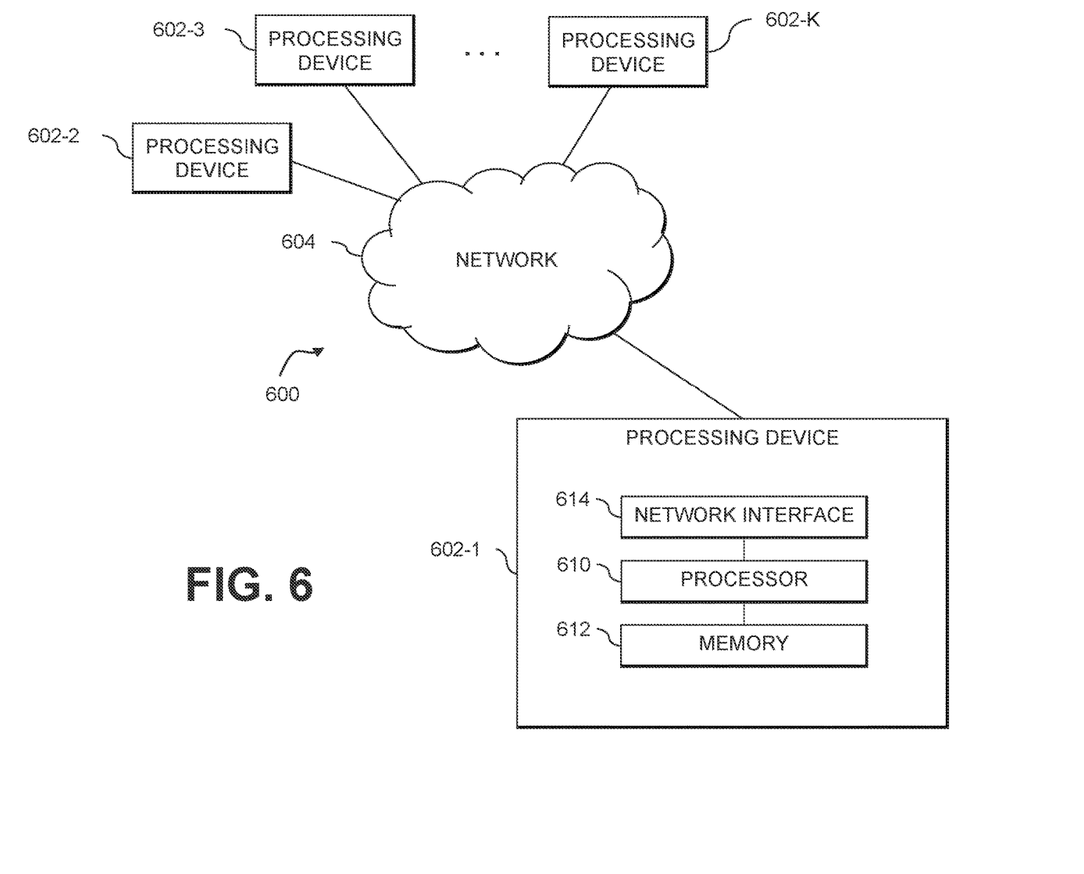

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for AR-assisted servicing of IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to capture, via at least one camera of augmented reality hardware, a live video feed of an information technology asset comprising one or more hardware components;
to track, in the live video feed, one or more objects of interest, at least one of the one or more objects of interest comprising at least one of the one or more hardware components of the information technology asset that is to be serviced;
to monitor system state information characterizing operation of the information technology asset;
to generate one or more additional video layers based at least in part on the tracked one or more objects of interest and the monitored system state information, the one or more additional video layers comprising information facilitating servicing of said at least one of the one or more hardware components of the information technology asset;
to generate a layered video feed comprising the one or more additional video layers overlayed on the live video feed of the information technology asset; and
to provide, to at least one display of the augmented reality hardware, the layered video feed;
wherein monitoring the system state information characterizing the operation of the information technology asset comprises (i) utilizing one or more application programming interfaces (APIs) exposed by the information technology asset to pull a first subset of the system state information and (ii) determining a second subset of the system state information based at least in part on analyzing one or more visual status indicators in the live video feed of the information technology asset.

2. The apparatus of claim 1 wherein the augmented reality hardware comprises augmented reality goggles.

3. The apparatus of claim 1 wherein the augmented reality hardware comprises at least one of a smartphone and a tablet computing device.

4. The apparatus of claim 3 wherein the layered video feed provided to the at least one display of the augmented reality hardware replaces the live video feed in a camera application of said at least one of the smartphone and the tablet computing device.

5. The apparatus of claim 1 wherein at least one of the one or more APIs exposed by the information technology asset that is to be serviced comprises a representational state transfer (REST) API.

6. The apparatus of claim 1 wherein monitoring the system state information characterizing the operation of the information technology asset is performed responsive to authenticating the information technology asset.

7. The apparatus of claim 6 wherein authenticating the information technology asset comprises scanning a user interface link of the information technology asset utilizing the at least one camera of the augmented reality hardware.

8. The apparatus of claim 7 wherein the user interface link comprises a quick response code.

9. The apparatus of claim 1 wherein at least one of the one or more additional video layers comprises an overlay image highlighting said at least one of the one or more hardware components to be serviced.

10. The apparatus of claim 1 wherein at least one of the one or more additional video layers comprise an overlay image that at least one of: highlights one or more hardware slots of the information technology asset in which said at least one of the one or more hardware components is to be installed; and highlights one or more cables of the information technology asset which are to be at least one of connected to said at least one of the one or more hardware components to be serviced and disconnected from said at least one of the one or more hardware components to be serviced.

11. The apparatus of claim 1 wherein at least one of the one or more additional video layers comprises text instructions for how to perform servicing of said at least one of the one or more hardware components.

12. The apparatus of claim 1 wherein at least one of the one or more additional video layers comprises an animation illustrating at least a portion of a process for at least one of removal of said at least one of the one or more hardware components from the information technology asset and installation of said at least one of the one or more hardware components in the information technology asset.

13. The apparatus of claim 1 wherein generating the layered video feed comprises dynamically updating at least one of the one or more additional video layers in response to changes in the monitored system state information of the information technology asset.

14. The apparatus of claim 1 wherein generating the layered video feed comprises dynamically updating at least one of the one or more additional video layers in response to identifying, in the live video feed of the information technology asset, deviation of a designated process for servicing said at least one of the one or more hardware components of the information technology asset.

15. A computer program product comprising a non-transitory processor-readable storage medium having stored therein program code of one or more software programs, wherein the program code when executed by at least one processing device causes the at least one processing device:
to capture, via at least one camera of augmented reality hardware, a live video feed of an information technology asset comprising one or more hardware components;
to track, in the live video feed, one or more objects of interest, at least one of the one or more objects of interest comprising at least one of the one or more hardware components of the information technology asset that is to be serviced;
to monitor system state information characterizing operation of the information technology asset;
to generate one or more additional video layers based at least in part on the tracked one or more objects of interest and the monitored system state information, the one or more additional video layers comprising information facilitating servicing said at least one of the one or more hardware components of the information technology asset;
to generate a layered video feed comprising the one or more additional video layers overlayed on the live video feed of the information technology asset; and
to provide, to at least one display of the augmented reality hardware, the layered video feed;

wherein monitoring the system state information characterizing the operation of the information technology asset comprises (i) utilizing one or more application programming interfaces (APIs) exposed by the information technology asset to pull a first subset of the system state information and (ii) determining a second subset of the system state information based at least in part on analyzing one or more visual status indicators in the live video feed of the information technology asset.

16. The computer program product of claim 15 wherein at least one of the one or more APIs exposed by the information technology asset that is to be serviced comprises a representational state transfer (REST) API.

17. The computer program product of claim 15 wherein monitoring the system state information characterizing the operation of the information technology asset is performed responsive to authenticating the information technology asset, and wherein authenticating the information technology asset comprises scanning a user interface link of the information technology asset utilizing the at least one camera of the augmented reality hardware.

18. A method comprising:
capturing, via at least one camera of augmented reality hardware, a live video feed of an information technology asset comprising one or more hardware components;
tracking, in the live video feed, one or more objects of interest, at least one of the one or more objects of interest comprising at least one of the one or more hardware components of the information technology asset that is to be serviced;
monitoring system state information characterizing operation of the information technology asset;
generating one or more additional video layers based at least in part on the tracked one or more objects of interest and the monitored system state information, the one or more additional video layers comprising information facilitating servicing of said at least one of the one or more hardware components of the information technology asset;
generating a layered video feed comprising the one or more additional video layers overlayed on the live video feed of the information technology asset; and
providing, to at least one display of the augmented reality hardware, the layered video feed;
wherein monitoring the system state information characterizing the operation of the information technology asset comprises (i) utilizing one or more application programming interfaces (APIs) exposed by the information technology asset to pull a first subset of the system state information and (ii) determining a second subset of the system state information based at least in part on analyzing one or more visual status indicators in the live video feed of the information technology asset; and
wherein the method is performed using at least one processing device comprising a processor coupled to a memory.

19. The method of claim 18 wherein at least one of the one or more APIs exposed by the information technology asset that is to be serviced comprises a representational state transfer (REST) API.

20. The method of claim 18 wherein monitoring the system state information characterizing the operation of the information technology asset is performed responsive to authenticating the information technology asset, and wherein authenticating the information technology asset comprises scanning a user interface link of the information technology asset utilizing the at least one camera of the augmented reality hardware.

* * * * *